Aug. 10, 1965  J. C. SIMON-SUISSE  3,199,355
PRESSURE TRANSDUCERS
Filed July 19, 1962  2 Sheets-Sheet 1
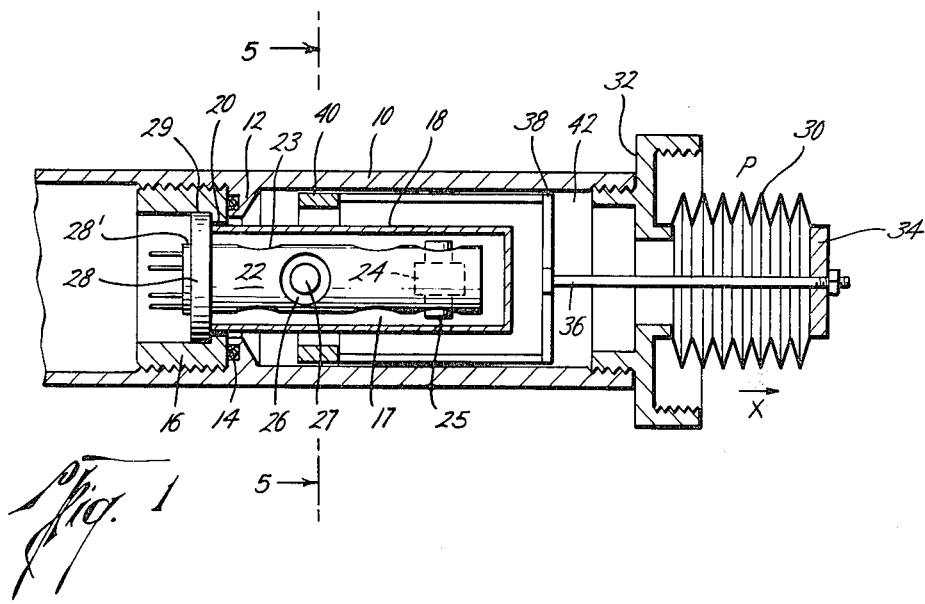
Fig. 1
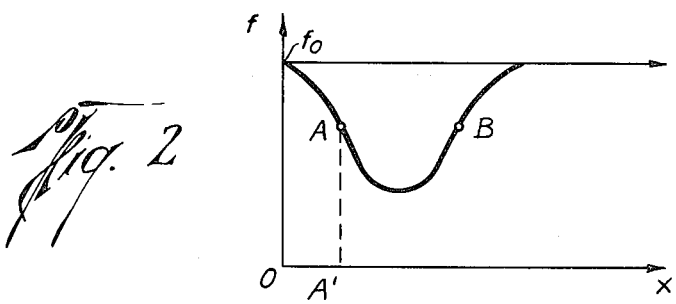
Fig. 2
Fig. 5
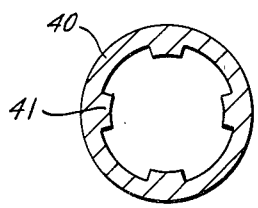
Jean Charles Simon-Suisse
INVENTOR.
BY Michael P. Breston
ATTORNEY

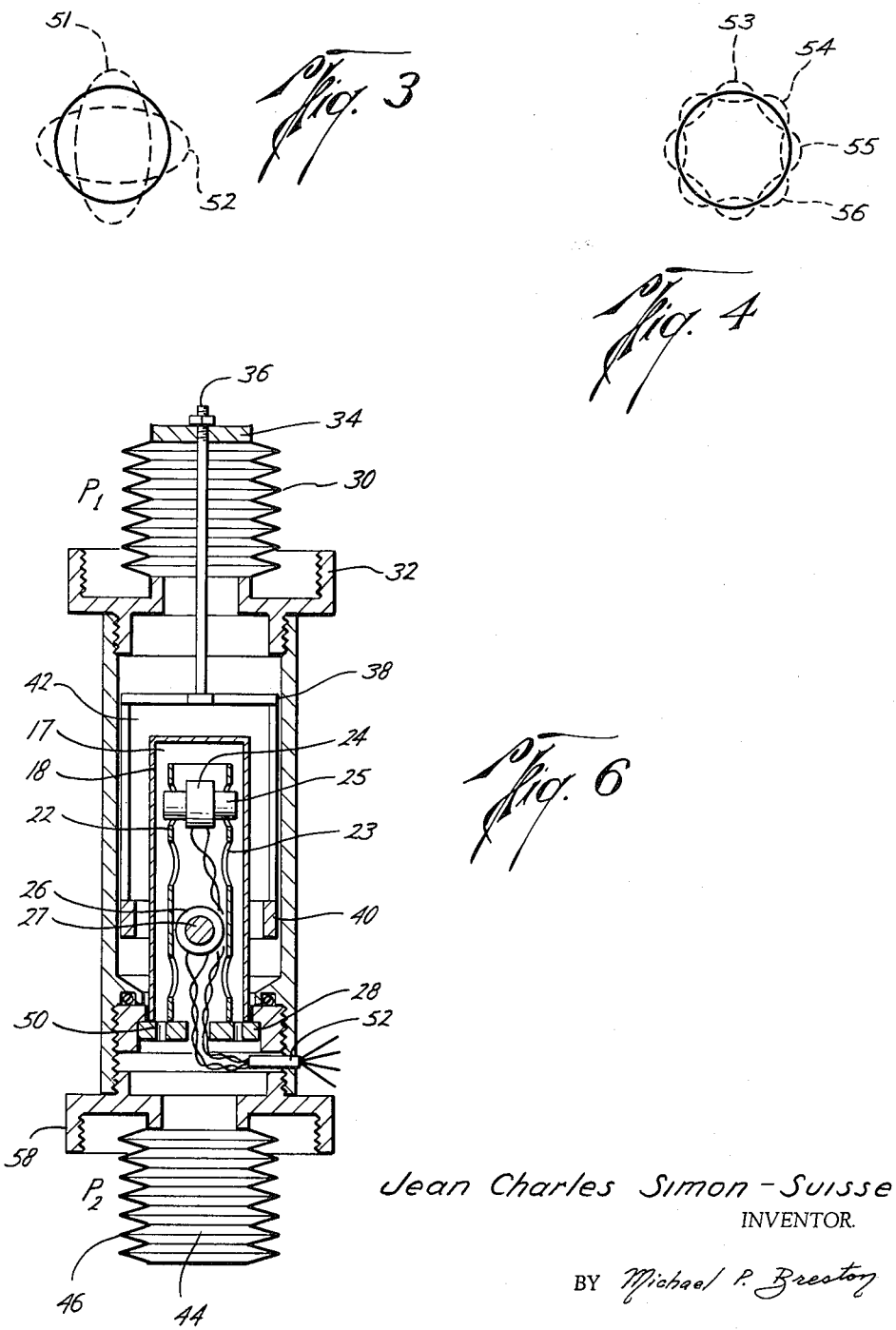

3,199,355
PRESSURE TRANSDUCERS
Jean Charles Simon-Suisse, Marly-le-Roi (Seine et Oise), France, assignor to Societe de Prospection Electrique Schlumberger, S.A., Paris, France, a corporation of France
Filed July 19, 1962, Ser. No. 210,952
Claims priority, application France, Jan. 6, 1962, 884,094
3 Claims. (Cl. 73—393)

This invention relates to pressure transducers and more particularly to pressure gauges employing vibratory, hollow members.

Pressure gauges employing vibratory, hollow members, for example cylinders, are generally known. Such pressure gauges are particularly useful in remote pressure measurements as in telemetry. A typical embodiment of such a known pressure gauge may include a hollow metal cylinder, one end of which carries a cover and the other end is suitably fitted inside a rigid support member. At least one face of the cylinder's thin wall is in contact with the fluids whose pressures are being measured, labeled hereinafter for concision as "measured fluids." With the aid of suitable energizing means, the cylinder is made to undergo radial and/or axial vibrations, the frequencies of which correspond to the cylinder's natural or resonant frequencies. A detailed description of the operation of a pressure gauge of the foregoing type may be found in U.S. Patent No. 3,021,711 published February 20, 1962.

However, the use of pressure gauges of the type disclosed in the U.S. Patent 3,021,711 to measure, for example, the pressures in comparatively heavy fluids, as in liquids under mean pressures and in gases under high pressures, yields results the accuracy of which is notably dependent upon the nature and the temperature of the measured fluids.

Accordingly, it is an object of this invention to provide new and improved pressure gauges of the vibratory, hollow member type, the accuracy of which is substantially independent of the nature of the measured fluids.

It is another object of this invention to provide new and improved pressure gauges of the foregoing character, the accuracy of measurements of which is substantially independent, over a relatively wide operating range, of the temperature variations in the measured fluids.

These and other apparent objects of the invention are accomplished by positioning the vibratory member inside a casing. The walls of the hollow member and casing form two chambers at least one of which is filled with a predetermined fluid whose specific gravity variations as a function of temperature are known to be stable, at least over the operating temperature range. The predetermined fluid is then indirectly subjected, via suitable pressure exchanging means, to the pressure of the measured fluids.

In this manner, the pressure of the measured fluids is applied indirectly to the vibratory member through the agency of the pressure exchanging means. As a result, the information provided by the pressure gauge of the invention is rendered substantially independent of the nature of the measured fluids which, in accordance with this feature of the invention, are prevented from surrounding the walls of the vibratory member.

According to another distinguishing feature of the invention, the pressure exchanging means are preferably constituted by metal bellows, one end of which is fixedly fastened to the casing surrounding the vibratory member, whereas the other end is free to move. The latter movable end is secured, through a suitable linkage, to a generally annular compensating member which is separated from one of the vibratory member's ends by a length approximating one-quarter of the free length of the vibratory member. The compensating member is adapted to move freely, along the wall of the vibratory member, in response to the movements of the bellows' free end. A change in the temperature of the measured fluid results in a corresponding displacement of the bellows' free end and, hence, of the compensating member. It is thus possible to obtain that the variations in the vibratory member's natural frequency, such as the natural frequency of cylinder 18, produced by changes in the specific gravity of the liquid immediately surrounding the vibratory member, can be accompanied by equal but opposite variations in frequency resulting from the shifting of the compensating member's position along the vibratory member's wall. In this manner, the frequency modulated signals provided by the apparatus become substantially free of errors, resulting from temperature or other variations affecting the specific gravity of the liquid surrounding the vibratory member.

The features of the invention which are believed to be novel are set forth with particularity in the appended claims. The invention itself, however, both as to its organization and mode of operation, together with further objects and advantages thereof, may best be understood by reference to the following description taken in conjunction with the accompanying drawings in which:

FIG. 1 is a view in elevation, partly in cross-section, of one preferred embodiment of the invention;

FIG. 2 is a typical curve representing the variation in frequency as a function of the position of the compensating member of FIG. 1;

FIGURES 3 and 4 represent illustrative modes of vibration of the vibratory member of FIG. 1;

FIG. 5 is a cross-section of a typical shape of the compensating member of FIG. 1; and FIG. 6 is a view in elevation, partly in cross-section, of another embodiment of the invention.

Referring now to FIG. 1, there is provided a cylindrical steel casing 10 having an inner shoulder 12 inside which is housed an O ring 14. Bearing energetically against O ring 14 is an annular member 16 threadably mounted inside casing 10. Member 16 forms the support for a hollow magnetic member 18 illustratively shown as a cylinder. The magnetic material used to make cylinder 18 should preferably have a substantially zero thermoelastic coefficient for rendering the frequency of the cylinder's vibrations substantially independent of its temperature variations within the operating temperature range. One such suitable material is known in the trade as Elinvar. Other known materials can also be used. The wall of cylinder 18 is made thin and its free end is fitted at 20 inside the annular member 16.

In order to impart vibrations to the hollow cylinder 18, there is coaxially mounted in the inner chamber 17 of cylinder 18 a hollow tube 22 having apertures 23. Secured to the tube 22, along two substantially perpendicular diameters and at a suitable distance from each other, are an energizing coil 24 and a detecting coil 26. Coil 24 is provided with a soft iron core 25 and coil 26 is provided with a permanent magnet core 27. Tube 22 is carried by a pedestal 28 which is secured through a fluid-tight glued junction 29 to a shoulder on the annular member 16. Electrical conductors leading to the coils 24, 26 may be introduced through the pedestal 28 and the tube 22 via a suitable connector 28'.

The chamber 17 inside cylinder 18 is filled with a gas the pressure of which is such that, for a maximum expected temperature change, the corresponding increase in its pressure is lower than the absolute accuracy of the required pressure measurement.

Casing 10 is provided with a pressure transmitting member, preferably a metal bellows 30, which is secured to the casing by a fluid-tight coupling 32 to which one end of the bellows is welded. The movable free end of the bellows 30 is sealed by a rigid cover 34 carrying at its center a rod 36. Coupled with rod 36 is a stirrup 38 which is secured to a compensating member 40 preferably of annular shape. Member 40 is fitted in casing 10 without making contact with the outer wall of cylinder 18 and is separated from the anchoring point 20 by a length approximating one quarter of the free length of cylinder 18. Ring 40 is adapted to slide freely inside the casing 10.

The fluid-tight chamber 42 formed by the inside wall of casing 10 and by the outside wall of cylinder 18 is filled with a suitable fluid, the properties of which are well known, at least over the expected ranges of encountered temperatures and pressures. This fluid may consist, for example, of a mixture, in predetermined proportions, of decane and tetradecane, the respective densities of which are 0.7455 and 0.7787 at 0° C. Thus, during calibration tests following the manufacture of the apparatus, its frequency deviation from a standard frequency, such as the natural frequency of cylinder 18, can be compensated by modifying gradually the proportions of the mixture, inasmuch as the vibratory member's natural frequency is a function of the density or specific gravity of this mixture, as will subsequently become more evident.

FIG. 2 illustrates the changes in the vibratory frequency of cylinder 18 obtained by shifting from point to point the ring 40 along the outside wall of cylinder 18 starting from the anchoring point 20. The shape of the curve shown in FIGURE 2 may be explained as follows. Adjacent each end of cylinder 18, there is a vibratory node whereas at its center there is an antinode. Thus, the length of cylinder 18 corresponds substantially to one-half wave length. By shifting the ring 40 from one end of cylinder 18 to the other, one increases the kinetic energy of the liquid system surrounding the cylinder up to a maximum and then one reduces the kinetic energy to a low value. As a matter of fact, the layers of liquid surrounding the vibratory cylinder 18 are provided with a kinetic energy which is all the larger when the layers are nearer the vibratory antinode. Upon nearing the middle of the vibratory cylinder 18, the ring 40 reduces the surface of the flow of the liquid. This reduction causes the liquid layers to be subjected to intensified movements even though the amplitude of the pressure generated by the vibrating cylinder is not substantially modified by the position of the ring. Therefore, the movement of the ring 40 towards the vibratory antinode of cylinder 18 is accompanied by a local increase of the speed of the liquid layers which speed is proportional to the initial amplitude of the liquid movements. As a result, the total kinetic energy of the liquid system surrounding the vibratory cylinder 18 is also increased. It will be apparent that an increase in the total kinetic energy of the liquid will in turn cause a decrease in the natural frequency $f_0$ of the cylinder. Two inflection points A and B characterize this curve. At point A, having an abscissa A' corresponding approximately to one-quarter of the free length of cylinder 18, the tangent to the curve is negative, whereas at point B, symmetrically located with respect to a radial plane passing through the median section of cylinder 18, the tangent is positive. It will be appreciated that in the immediate vicinity of the inflection points A and B, small displacements of the compensating ring 40 produce substantially linear variations in the vibratory frequency of cylinder 18. It is this effect which is made use, in acordance with this feature of the invention, to compensate for frequency drifts produced by temperature variations occurring in the measured fluids in which the apparatus is immersed. In this manner, the natural frequency $f_0$ of the vibratory cylinder 18 will be maintained substantially constant as shown by the horizontal line in FIG. 2.

The variations in the cylinder's natural frequency $f_0$ resulting from changes in the circumambient conditions, as in temperatures and pressures, can be ascribed to several causes most of which, if not all, can be substantially eliminated from the apparatus of the invention. Thus, because the thermoelastic coefficient of the material forming cylinder 18 is practically equal to zero, there is no drifting of the natural frequency $f_0$ which can be ascribed directly to slight variations in the diameter of the vibratory cylinder itself. As to the drifting of the natural frequency $f_0$ ascribable to the expansion of the gas filling chamber 17 inside cylinder 18, its value as a function of temperature, in the operating temperature range, is relatively negligible: for a given increase in the temperature of the apparatus, the corresponding increase in pressure in chamber 17 is lower than the absolute accuracy of the required measurement.

By far the most influential factor responsible for making the natural frequency $f_0$ a notable function of circumambient conditions, such as temperatures, is caused by the changes in the specific gravity of the liquid filling chamber 42. For example, the expansion of the volume of chamber 42 is accompanied by a reduction in the specific gravity of its liquid surrounding cylinder 18. The change in the surrounding liquid's specific gravity is, in turn, accompanied by a corresponding change in its kinetic energy. As a result, because of the interdependence between the natural frequency $f_0$ of cylinder 18 and the kinetic energy of the liquid in chamber 42, the cylinder's natural frequency also tends to change. It will now be shown that a change $\Delta f$ in the natural frequency $f_0$ caused, for example, by a change $\Delta T$ in the circumambient temperature T can be made substantially equal to the simultaneous change $-\Delta f$ in the natural frequency $f_0$ caused by the accompanying displacement $\Delta x$ of the compensating annular ring 40.

Let $V_0$ be the volume of the liquid filling chamber 42, $\rho_0$ its specific gravity, both under reference temperature and pressure conditions, S the effective cross-section of bellows 30 and $x$ the abscissa of rod 36 (see FIG. 2), then $$dV = S dx \qquad (1)$$

For small variations $d\rho$ of $\rho$, neglecting second order terms, $$\frac{dV}{V_0} = -\frac{d\rho}{\rho_0} \qquad (2)$$

Substituting Equation 2 into Equation 1 and rearranging terms, $$dx = -\frac{V_0}{S}\frac{d\rho}{\rho_0} \qquad (3)$$

Assuming the annular ring 40 to be near point A, displaced from the anchored end 20 of the vibratory cylinder 18 by a length $x$ approximating one-quarter of the total length of cylinder 18, then the frequency change $\Delta f$ is given by (see FIG. 2), $$\Delta f = (-b) dx \qquad (4)$$

where $(-b)$ is the slope of the tangent at point A.

Substituting Equation 4 into Equation 3 yields, $$\Delta f = +\frac{bV_0}{S\rho_0} d\rho \qquad (5)$$

Equation 5 provides the expression for the value of the change $\Delta f$ in the natural frequency produced by a small displacement of the annular compensating ring 40 connected to the movable free end of bellows 30. But, in the absence of the connections between cover 34 and the compensating ring 40, the frequency change $\Delta f$ in the natural frequency $f_0$ would be governed by, $$\Delta f = -\frac{a}{2}(1+a\rho_0)^{-\frac{3}{2}} d\rho \qquad (6)$$

Equation 6 holds because the frequency of vibration $f$ of the cylinder 18 when immersed in a liquid related to the density $\rho_0$ of the liquid and to the natural frequency $f_0$ of the cylinder 18 set in a vacuum by the following equation:

$$f = f_0^2 / (1 + a\rho_0)$$

where $a$ is a constant dependent upon the shape of chamber 42.

Since the effects of the displacement of the compensating ring 40 and of the change in the specific gravity appear simultaneously, their resultant effect on the natural frequency $f_0$ of cylinder 18 can be obtained by adding Equations 5 and 6. Hence, the total frequency change $\Delta f_T$ is obtained by adding the frequency change due to a displacement of ring 40, in accordance with Equation 5, to the frequency change due to a change in the specific gravity of the liquid, in accordance with Equation 6.

$$\Delta f_T = \left[ +\frac{b}{S}\frac{V_0}{\rho_0} - \frac{a}{2}(1+a\rho_0)^{-\frac{3}{2}} \right] d\rho \qquad (7)$$

If the shapes of the compensating member 40 and of the chamber 42 are properly selected, it is possible to eliminate the total frequency change $\Delta f_T$ by making the expression inside the brackets of Equation 7 equal to zero, that is, $$\frac{b}{S}\frac{V_0}{\rho_0} + \frac{a}{2}(1+a\rho_0)^{-\frac{3}{2}} \qquad (8)$$

Equation 8 shows that the information provided by the pressure gauge in accordance with the invention can be made substantially independent of the modifications in the specific gravity of the fluid filling chamber 42 whatever the causes for such modifications may be. Although the variations in the specific gravity of the liquid in chamber 42 were primarily attributed in the above exposition to temperature variations, they may also be attributed to pressure variations and other causes.

For the operation to be governed by Equation 8, ring 40 is provided with lobes 41 affording modifications in thickness on the inner surface of ring 40 which retains its symmetry with reference to the radial vivratory modes of cylinder 18. The lobes or the variations modifications in thickness of ring 40 will thus depend on the type of radial vibrations assumed by cylinder 18.

FIGS. 3 and 4 illustrate a pair of such vibrations. As shown in FIG. 3, cylinder 18 vibrates in mode 2, that is, it assumes two radial lobes, 51 and 52. The heavy line indicates the position of balance of cylinder 18 and the dotted lines indicate its extreme end positions. Similarly in FIG. 4, cylinder 18 vibrates in mode 4, that is, it assumes four radial lobes 53–56. Assuming that the desired vibratory mode of cylinder 18 corresponds to a modus 4, then, as shown in FIG. 5, the compensating ring 40 would be provided with four lobes 41 symmetrically distributed with respect to a media plane passing through the center of the ring.

It was first theoretically established and then experimentally confirmed that the relative rotation by one-quarter of a revolution between ring 40, as shown in FIG. 5, and tube 22 carrying the excitation coil 24, corresponds to a modification in the natural frequency of cylinder 18 in accordance with a curve similar to that illustrated in FIG. 2. Consequently it is possible, by rotating either ring 40 or tube 22 with reference to cylinder 18 to make the natural frequency $f_0$ of the vibratory cylinder 18 completely independent, over a wide temperature range, of temperature variations in the medium in which the apparatus is immersed. That is, it is possible to select a slope at either point A or B (FIG. 2) which is substantially equal and of opposite sign to the coefficient binding the change in frequency due to variations in the specific gravity of the liquid filling chamber 42.

In operation, by applying a suitable alternating current signal to the energizing coil 24, cylinder 18 can be selectively set into vibration in a plurality of radial and longitudinal modes. Two such radial modes are shown in FIGURES 3 and 4.

To measure an absolute pressure of a medium, the bellows 30 are immersed into the medium with the result that the medium's pressure is indirectly exerted upon the vibratory cylinder 18, hence producing a net difference in pressure $\Delta p$ between the inner and outer walls of the cylinder. It can be shown that the square of the frequency of vibration $f$ of cylinder 18 is a substantially linear function of $\Delta p$. Consequently, the signals induced in the pick-up coil 26 become frequency modulated as a function of the measured absolute pressures. Thus the apparatus of FIG. 1 converts pressure variations into frequency variations around the natural frequency $f_0$ of cylinder 18. By maintaining the natural frequency $f_0$ free from drifts produced by variations in the circumambient conditions, the pressure gauge of the invention yields highly accurate results. Of course, as suggested in said British patent, the two coils 24 and 26 may be coupled via an amplifier to produce an oscillatory system. The output signal may then be derived from the amplifier and transmitted to a frequency meter. It will be appreciated that, inasmuch as frequency modulation is used in telemetry, the apparatus of the invention is particularly useful in remote measurements.

Because the pressure of the gas filling chamber 17 is relatively low, it will be appreciated that the embodiment illustrated in FIG. 1 is especially suitable to measure the absolute pressure P of a medium surrounding the outer wall of bellows 30.

In FIG. 6 on the other hand, is illustrated a modified embodiment especially adapted for the measurement of the difference in pressure between two media. To better set forth the similarity between the embodiments of FIGURES 1 and 6, like parts are identically referenced. Only those elements of FIG. 6 not found in FIG. 1 are described below.

The pressure $P_1$ of the first medium is transmitted by bellows 30 to the outer wall of the vibratory cylinder 18 in a manner previously described. In a similar manner, pressure $P_2$ is transmitted to the inner wall of the vibratory cylinder 18 by a second bellows 46 coupled to the outer free end of casing 10 through a second fluid-tight coupling 58 similar to coupling 32. The inner volume 44 of bellows 46 comunicates with the inner volume 17 of the vibratory cylinder 18 through suitable apertures 50 formed in pedestal 28. The conductors leading to coils 24, 26 can be brought out from casing 10 through a fluid-tight channel 52. Chambers 17 and 44 are filled with a liquid having stable and known properties over the expected operating temperature and pressure ranges. For convenience, the same liquid may be used to fill chambers 17, 42 and 44. As previously explained, this liquid may be formed of a mixture of predetermined proportions of miscible liquids, such as decane and tetradecane, having distinct specific gravities. Through this liquid, pressure $P_1$ of the first medium will be transmitted to the outer wall and pressure $P_2$ of the second medium will be transmitted to the inner wall of cylinder 18. By thus allowing the difference in pressure $\Delta p$ to act directly on the vibratory cylinder 18 so as to change its resonant frequency, very accurate measurements of pressure differentials can be achieved. It will be apparent, from the above given theoretical analysis, that the vibratory cylinder's natural frequency $f_0$ is dependent on the pressure differential $\Delta P = P_1 - P_2$. The method for measuring the natural frequency of cylinder 18 in the differential pressure transducer of FIG. 6 is the same as that described in relation to the absolute pressure transducer illustrated in FIG. 1; hence, a repetition thereof is believed not to be necessary. It will be readily appreciated, for reasons previously given, that the differential pressure transducer of FIG. 6 will yield results, the accuracy of which is substantially independent of variations in the nature and in the temperature of the measured fluids.

While the present invention has been described with reference to particular embodiments thereof, it will be understood by men skilled in the art that various modifications may be made therein without departing from the spirit of the invention as defined in the appended claims. For instance, various detailed modifications may be made in the geometry of the various components; for example, the shape of the cross-section of the compensating ring 40 may be subjected to various modifications: it is possible to accentuate the lobes 41 rather than their corresponding recesses or, else, to provide openings in ring 40 instead of increasing locally its thickness.

What is claimed is:

1. A pressure transducer providing frequency modulated signals in dependence upon the pressures of a fluid medium and substantially independent of the temperature variations of said medium, said transducer comprising:
   a vibratory hollow member of magnetic material, said hollow member defining a chamber;
   a casing enclosing said hollow member;
   a liquid filling the space between the outer walls of said hollow member and said casing, said liquid having a predetermined density-versus-temperature characteristic;
   a fluid in said chamber, said fluid being under a predetermined pressure;
   pressure exchanging means terminating said casing for communicating the pressures of said fluid medium to said liquid, said pressure exchanging means including a rigid movable wall;
   a compensating member mounted between the outer wall of said hollow member and the inner wall of said casing;
   linking means coupling said wall with said compensating member, said compensating member being displaceable relative to one end of said hollow member in response to displacements by said movable wall;
   first means housed in said chamber for imparting vibrations to said hollow member; and
   second means inside said hollow member responsive to the vibrations of said hollow member for providing an oscillatory electric signal, the frequency of said signal varying as a function of variations in the pressures of said fluid medium.

2. The transducer of claim 1 wherein said hollow member is a cylinder and said compensating member is an annular ring having on its inner surface a number of lobes said number being dependent upon the mode of vibration of said hollow member, said annular ring being spaced from one end of said hollow member a distance substantially equal to one-quarter of the free length of said hollow member.

3. A pressure transducer for measuring the difference in pressure between a first medium and a second medium comprising:
   an open-ended hollow casing,
   an apertured support member dividing the inner volume of said casing into a first chamber and a second chamber,
   a liquid of a predetermined density-versus-temperature characteristic filling each chamber, said liquid inside each chamber being formed of a mixture of predetermined proportions of miscilbe liquids having distinct specific gravities, said proportions being adjusted for obtaining, under determined conditions of temperature and pressure, a reference frequency of vibrations;
   a hollow tubular member inside said casing, said hollow tubular member being formed of a magnetic metal having a thermal elastic coefficient approximating zero and further having an open end which is anchored to said support member whereby the liquid filling said second chamber fills the inner volume of said tubular member through the apertures of said support member;
   first pressure exchanging means coupled to one end of said casing for communicating through the liquid of said first chamber the pressure of said first medium to the outer wall of said hollow tubular member,
   second pressure exchanging means terminating the other end of said casing for communicating through the liquid of said second chamber the pressure of said second medium to the inner wall of said hollow tubular member,
   an annular-shaped compensating member mounted without any contact around said hollow tubular member and being displaced from one of the ends of said hollow member by a length approximately one-quarter of the free length of said hollow member,
   first means inside said tubular member for imparting vibrations to said tubular member, and second means inside said tubular member responsive to said vibrations for providing an oscillatory electric signal, the frequency of which is dependent in a known manner upon the density of said liquid and upon the difference in pressure between said first and second media, and
   said first pressure exchanging means including a rigid movable wall, and a rigid linking means coupling said wall with said compensating member thereby rendering the frequency of said signal substantially independent of variations in circumambient conditions.

References Cited by the Examiner

UNITED STATES PATENTS 2,635,462 4/53 Poole et al. _____ 73—32
3,021,711 2/62 Arvidson _____ 73—398
3,047,022 7/62 Aldinger _____ 73—398 X

FOREIGN PATENTS 786,113 11/57 Great Britain.

RICHARD C. QUEISSER, *Primary Examiner.*

JOSEPH P. STRIZAK, *Examiner.*